United States Patent
Presidio

(10) Patent No.: US 7,097,159 B1
(45) Date of Patent: Aug. 29, 2006

(54) JACK PIN REMOVAL DEVICE

(76) Inventor: Lynn Presidio, 24527 Dersch Rd., Anderson, CA (US) 96007

( * ) Notice: Subject to any disclaimer, the term of this patent is extended or adjusted under 35 U.S.C. 154(b) by 46 days.

(21) Appl. No.: 10/844,367

(22) Filed: May 13, 2004

(51) Int. Cl.
*B60S 9/02* (2006.01)

(52) U.S. Cl. .................................. 254/420

(58) Field of Classification Search ............... 254/420, 254/418, 424, 425, 131, 120; 29/267
See application file for complete search history.

(56) References Cited

U.S. PATENT DOCUMENTS 5,340,143 A * 8/1994 Williams, Jr. ............... 280/475
5,769,395 A * 6/1998 Patti ........................... 254/129
6,764,065 B1 * 7/2004 Fox ............................. 254/420

* cited by examiner

Primary Examiner—Robert C. Watson
(74) Attorney, Agent, or Firm—Theodore J. Bielen, Jr.

(57) ABSTRACT

A device for removing a clip pin from a jack utilizing a lever having a first portion, a second portion, and a fulcrum therebetween. The arm is linked to the fulcrum of the lever and extends outwardly to bear on the housing of the jack. A fastener holds the lever first portion to the clip pin of the jack such that movement of the second portion of the lever about the fulcrum removes the clip pin.

12 Claims, 3 Drawing Sheets

JACK PIN REMOVAL DEVICE

BACKGROUND OF THE INVENTION

The present invention relates to a novel and useful device for moving a clip pin relative to a jack to allow manipulation of the jack.

Jacks are employed in many situations to level a vehicle or structure. Such leveling entails support of the structure by the jack and moving of the jack in an upward or downward motion, usually by a crank. Typically, a jack includes an upper portion, and a telescopically movable second portion having a foot for contacting the ground surface. The upper portion of a jack is attached to a structure such as a vehicle, trailer home and the like at the upper portion. A jack screw mechanism, or the like, is turned by the crank to bring together or separate the two portions of the jack and, thus, level the structure attached to the jack. A wire clip pin associated with screw mechanism is also found in this type of jack and may be pulled to allow rapid movement between the upper and lower portions of the jack. In this manner, the cranking of the jack an inordinate number of times is avoided, restricting the cranking of the jack to determine final level of the structure supported by the jack. Unfortunately, the clip pin is normally spring loaded and very difficult to move outwardly from the screw mechanism utilized to operate the jack.

The device for moving an indent pin relative to a jack would be a notable improvement in tools employed with jack supported structures.

BRIEF SUMMARY OF THE INVENTION

In accordance with the present invention a novel and useful device for moving an indent pin relative to a jack is herein provided.

The device of the present invention utilizes a lever having a first portion, a second portion, and a fulcrum between the first and second portions. The lever may be formed of any rigid or semi rigid material such as metal, plastic, a composite, and the like.

An arm is also employed in the present invention and is linked to the fulcrum of the lever. The arm includes a first end portion positioned at the fulcrum and a second end portion which bears on the housing of the jack. The arm may include a pad disposed between the end of the same and the housing of the jack and is rotatably attached to the fulcrum of the lever by a pivot pin or like item. A cavity may be formed in the lever to accommodate a part of the first end portion of the arm, while a fastener in the form of an elongated member engages the arm within the cavity, to rotatably hold the same in place.

A fastener is also employed for holding the lever first portion to the wire clip pin of the jack. Such fastener may take the form of providing the lever with a recess such that a fastener may pinion the wire clip pin within the recess. Such fastener may be formed as a threaded screw which penetrates the wall of the lever and holds the indent pin against the wall of the lever within the recess formed.

A grip is also used and permits the user of the device of the present invention to grasp the lever. Such grip is found generally at the second end portion of the lever and it may be located at an angled portion of the second end portion of the lever. The grip may also externalize in a resilient pad to aid the user in operation of the device of the present invention.

A strap may also be employed with the lever of the present invention and may take the form of a resilient band that lies along the lever and is removably fastened thereto to form a loop. The band may be looped around structures found in the member being supported by the jack, allowing the device of the present invention to be connected to a jack in a permanent or semi permanent fashion.

It may be apparent that a novel and useful device for moving a wire clip pin relative to a jack has been hereinabove described.

It is therefore an object of the present invention to provide a device for moving a wire clip pin relative to a jack in order to allow a user to quickly adjust the height of the jack without operating the jack crank.

Another object of the present invention is to provide a device for operating a jack supporting a structure in which a wire clip pin is easily moved from the screw mechanism of the jack to allow a leveling of a structure in a safe and efficient manner.

Another object of the present invention is to provide a device for moving a wire clip pin relative to a jack which saves time and effort in leveling structures supported by the jack.

A further object of the present invention is to provide a device for moving a wire clip relative to a jack which prevents injuries associated with leveling of a jack in a conventional manner.

The invention possesses other objects and advantages especially as concerns particular characteristics and features thereof which will become apparent as the specification continues.

For a better understanding of the invention reference is made to the following detailed description of the preferred embodiments thereof which should be taken in conjunction with the prior described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior delineated drawings.

Figure 1:
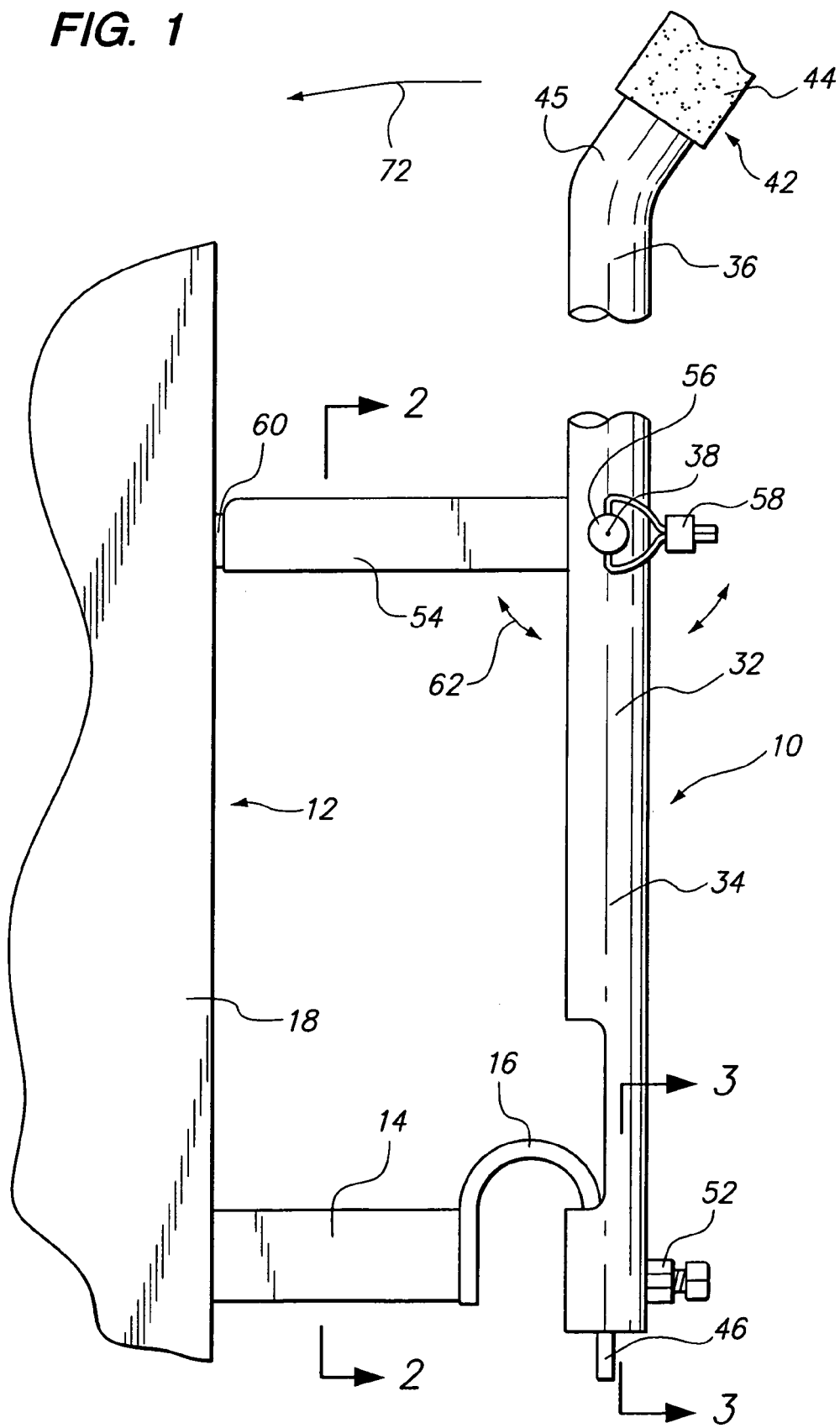
FIG. 1 is a front, broken, elevational view of the device of the present invention in use with a conventional jack.
Figure 5:
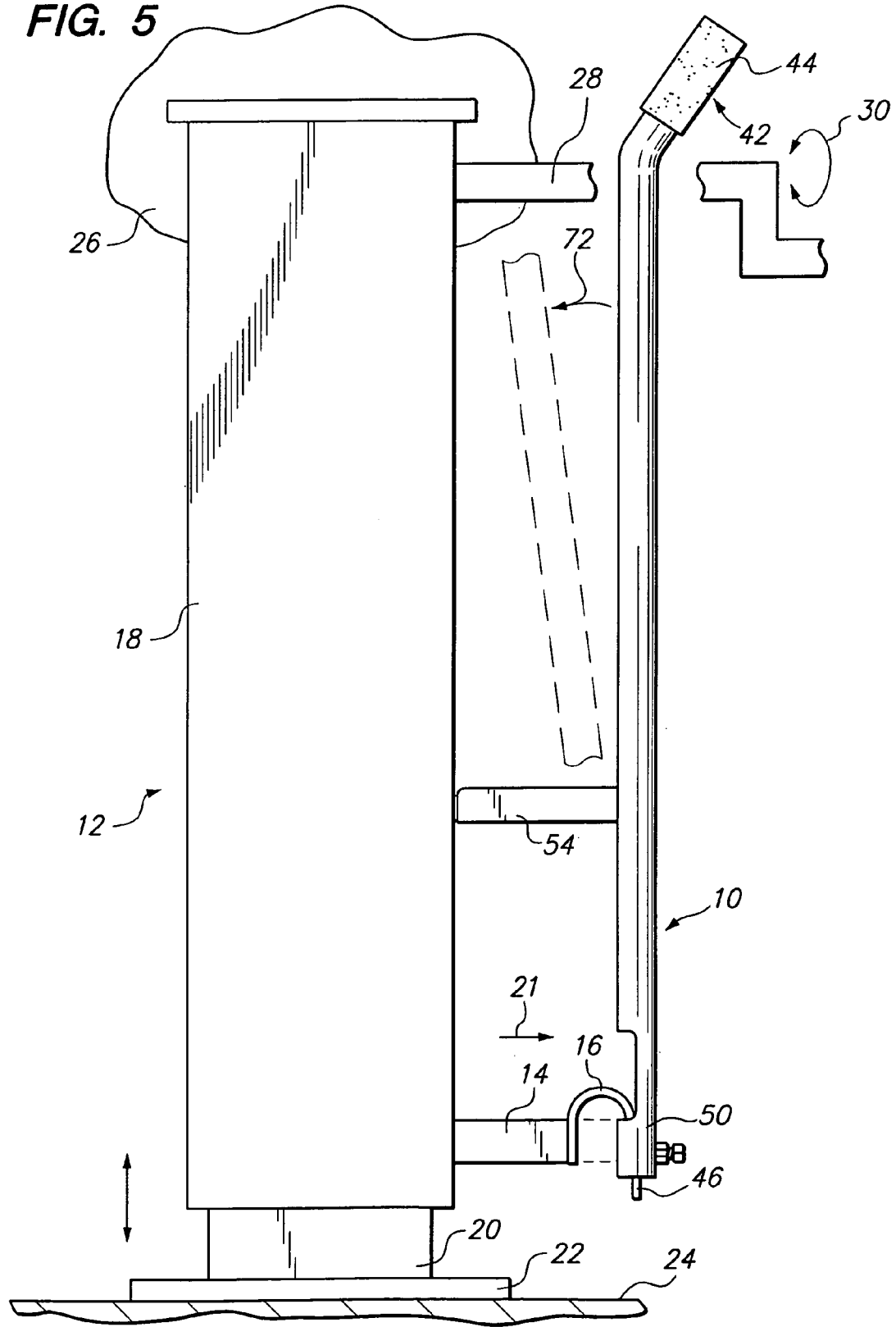
FIG. 5 is a front elevational view of the present invention in use with a conventional jack and illustrating the movement of the lever arm in phantom.

A preferred embodiment of the invention as a whole is shown in the drawings by reference character 10, FIGS. 1 and 5. The device 10 is intended to be used with a conventional jack 12, shown partially in FIG. 1. Specifically, device 10 is intended to manipulate or operate wire clip pin 14 which is directly engaged with the screw mechanism associated with jack 12. In this regard, jack 12 may be a model number 1, manufactured by Bulldog of Arnold, Mo. Wire clip 14 terminates in a semi-circular ring or open loop 16. Indent pin 14 is normally spring loaded and biased toward jack housing 18. The pulling of wire clip pin 14 away from jack housing 18 allows foot portion 20 of jack 12 to move upwardly and downwardly with ease, directional arrow 21. Although foot portion 20 is spring loaded, also, one may easily move foot portion 20 downwardly with the pressure exerted by a foot. Foot 20 terminates in a plate 22 which lies on ground surface 24, FIG. 5. Upper portion housing 18 of jack 12 is normally connected to a vehicle or edifice 26. The screw mechanism of jack 12 operates by crank 28 which moves according to directional arrow 30.

Figure 2:
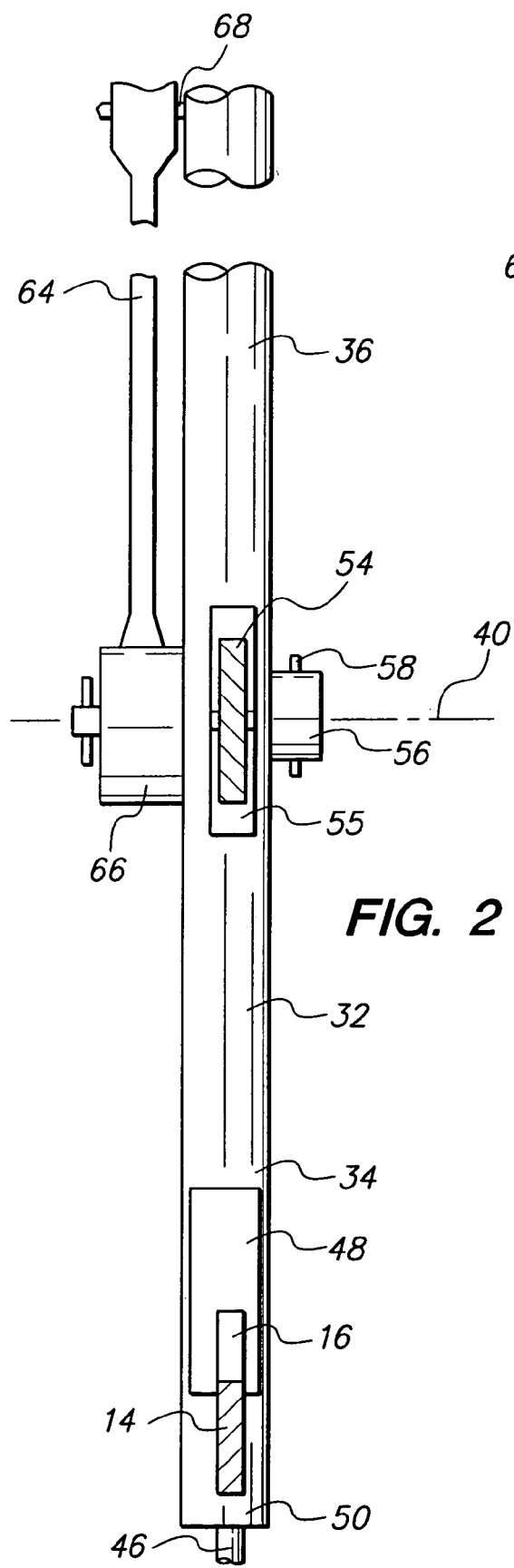
FIG. 2 is a sectional view taken along line 2—2 of FIG. 1.

Device 10 is formed with a lever tube 32 having a first portion 34 and a second portion 36. A fulcrum 38 lies along axis 40, best shown in FIG. 2. Second portion 36, shown in broken configuration in FIG. 1, terminates in a grip 42 which includes padding 44 on angled portion 45 of lever tube 32.

Figure 4:
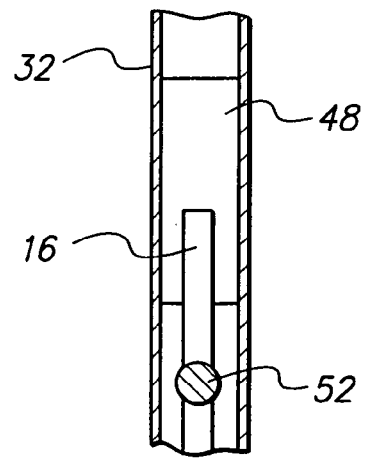
FIG. 4 is a sectional view taken along line 4—4 of FIG. 1.

Referring again to FIG. 1, it may be seen that wire clip pin 14, namely open loop 16, is held to first end portion 34 of lever tube 32. In this regard, open loop member 16 includes an end 46 which enters recess 48 of first end portion 34 of lever tube 32. End 46 passes through the hollow interior of tube 32 and extends beyond the end 50 of lever tube 32. A fastener 52, in the form of a threaded nut and bolt screws into the hollow interior of tube 32 and holds loop member 16 against the inner wall of tube 32, FIGS. 2 and 4.

Likewise, arm 54 is positioned at fulcrum 38 by elongated element 56 and is held thereto by wire lock 58. Arm 54 is intended to bear on housing 18 of jack 12 and may include a protector element or pad 60 to prevent marring of the surface of jack 18 when device 10 is in use. Arm 54 may rotate slightly about fulcrum 38 when not engaging jack 18, directional arrow 62.

Figure 3:
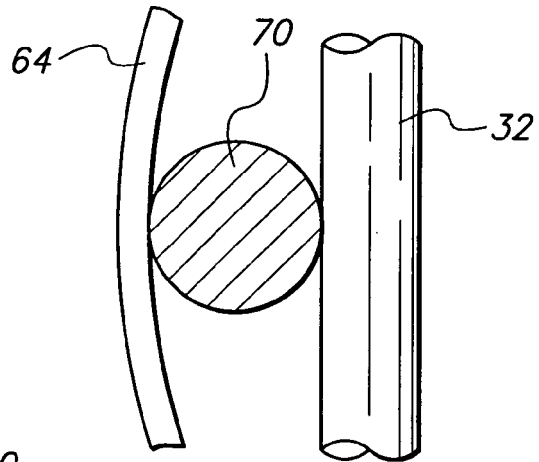
FIG. 3 is a partial front elevational view of a portion of the jack of the present invention showing the stabilizing strap mechanism.

Turning again to FIG. 2, it may be observed that a strap 64 may also be employed with device 10 of the present invention. Strap 64 extends from a base 66 also held to fulcrum 38 by elongated member 56. The other end of strap 64 is removably held to second portion 36 of tube 32 by a wire fastener 68. FIG. 3 represents the use of strap 64 positioned around a structure 70 usually found on supported structure 26. Thus, device 10 may be permanently or semi-permanently held to structure 26 at all times.

In operation, the user attaches wire clip pin 14 via open loop member 16 to first portion 34 of lever tube 32. Open loop member 16 enters recess 48 and extends through the hollow interior of lever tube 32. Fastener 52 is tightened to hold loop member 16 in place. Arm 54 is then positioned against the housing 18 such that protector 60 makes contact therewith. Cavity 55 allows a certain amount of play of arm 54, in this regard. The user then grasps padding 44 of grip 42 and pushes lever tube 32 toward housing 18, directional arrow 72. At this point wire clip pin 14 moves outwardly from jack body 18, directional arrow 21, and disengages foot portion 20 from housing 18. The user may then engage plate 22 (usually with a toe) and push foot portion downwardly until it touches ground surface 24. At that point, lever tube 32 is released or moved in the opposite direction to directional arrow 72 allowing wire clip pin to re-engage the screw mechanism found within jack 12. Normally, wire clip pin is spring loaded to bias its movement into engagement with the screw mechanism within jack 12. The user then turns crank 28, directional arrow 30 to slightly raise or lower jack 12 and supported structure 26, as needed. Strap 64 is employed to hold device 10 to either jack 18 or structure 26. For example, strap 64 may encircle crank handle 28 which may then be connected to structure 70.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A device for moving a pin relative to a jack having a housing and used in association with an object, comprising:
   a. a lever having a first portion, a second portion, and a fulcrum between said first and second portions; said lever further including a cavity;
   b. an arm linked to said fulcrum of said lever, said arm including a first end portion positioned at said fulcrum and a second end portion bearing on the housing of the jack; said first end portion of said arm lying in said cavity of said lever;
   c. a fastener, said fastener holding said lever first portion to the pin of the jack; said fastener further comprising an elongated member engaging said first end portion of said arm in said cavity; and
   d. a grip for permitting the gasping of the lever, said grip being located at said second portion of said lever.

2. The device of claim 1 in which said lever second portion additionally comprises an angulated section, said angulated section including said grip.

3. The device of claim 1 in which said elongated member rotatable engages said first end portion of said arm in said cavity.

4. The device of claim 1 in which said arm second end portion includes an end and a pad connected to said end.

5. The device of claim 1 which additionally comprises a strap connected to said lever, said strap including means for linking said strap to the object.

6. The device of claim 5 in which said lever second portion additionally comprises an angulated section, said angulated section including said grip.

7. A device for moving an pin relative to a jack having a housing and used in association with an object, comprising:
   a. a lever having a first portion, a second portion, and a fulcrum between said first and second portions, said lever further including a recess;
   b. an arm linked to said fulcrum of said lever, said arm including a first end portion positioned at said fulcrum and a second end portion bearing on the housing of the jack;
   c. a fastener for holding said lever first portion to the pin of the jack and for holding the pin of the jack within said recess of said arm; and
   d. a grip for permitting the gasping of the lever, said grip being located at said second portion of said lever.

8. The device of claim 7 in which said lever second portion additionally comprises an angulated section, said angulated section including said grip.

9. The device of claim 7 in which said elongated member rotatable engages said first end portion of said arm in said cavity.

10. The device of claim 7 in which said arm second end portion includes an end and a pad connected to said end.

11. The device of claim 7 which additionally comprises a strap connected to said lever, said strap including means for linking said strap to the object.

12. The device of claim 11 in which said lever second portion additionally comprises an angulated section, said angulated section including said grip.

\* \* \* \* \*